United States Patent [19]
Hanatani et al.

[11] Patent Number: 5,422,968
[45] Date of Patent: Jun. 6, 1995

[54] OPTICAL DEMULTIPLEXING SYSTEM WITH OPTICAL AMPLIFIERS

[75] Inventors: Shoichi Hanatani, Yono, Japan; Hideaki Tsushima, Ipswich, United Kingdom; Hiroaki Inoue, Hidaka, Japan

[73] Assignee: Hitachi, Ltd., Tokyo, Japan

[21] Appl. No.: 205,985

[22] Filed: Mar. 4, 1994

[30] Foreign Application Priority Data

Mar. 9, 1993 [JP] Japan .................................. 5-047728

[51] Int. Cl.$^6$ .............................................. G02B 6/28
[52] U.S. Cl. ............................................ 385/24; 385/31; 385/22
[58] Field of Search ...................... 385/24, 11, 31, 22, 385/7, 37, 41, 42

[56] References Cited

U.S. PATENT DOCUMENTS

| | | | |
|---|---|---|---|
| 4,923,271 | 5/1990 | Henry et al. | 385/37 X |
| 5,035,481 | 7/1991 | Mollenauer | 385/24 |
| 5,074,634 | 12/1991 | Takahashi | 385/24 |

OTHER PUBLICATIONS

Electronics Letters, Sep. 15, 1988, vol. 24, No. 19, pp. 1215–1217.

*Primary Examiner*—Rodney B. Bovernick
*Assistant Examiner*—Phan T. H. Palmer
*Attorney, Agent, or Firm*—Kenyon & Kenyon

[57] ABSTRACT

In an optical demultiplexing system comprising a plurality of optical demultiplexers for separating the component optical signals respectively having predetermined wavelengths of an input wavelength-multiplexed optical signal, a first optical amplifier is connected to the input of the optical demultiplexer disposed at the input end of the optical demultiplexing system, and a plurality of optical amplifiers are disposed to amplify the output optical signal of the first optical amplifier before the S/N ratio of the optical signal is caused to fall by optical losses caused within the optical demultiplexing system below a predetermined S/N ratio guaranteeing a predetermined bit error rate.

17 Claims, 7 Drawing Sheets

: OPTICAL AMPLIFIER     : DEMULTIPLEXER

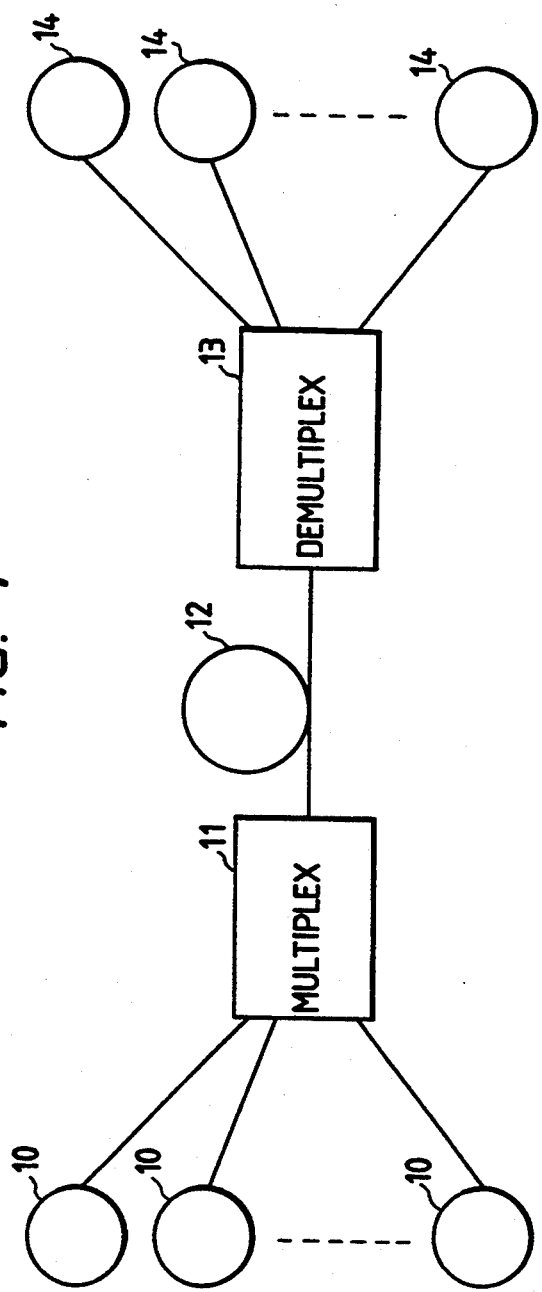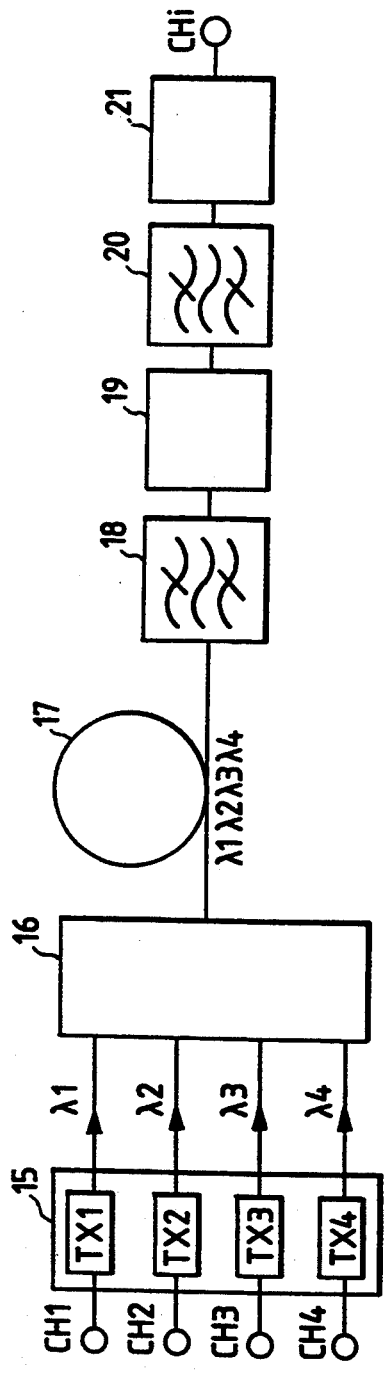
FIG. 4 PRIOR ART
FIG. 5 PRIOR ART

OPTICAL DEMULTIPLEXING SYSTEM WITH OPTICAL AMPLIFIERS

BACKGROUND OF THE INVENTION

1. Field of the Invention

The present invention relates to an optical demultiplexing system which separates optical signals having different wavelengths and transfers the separated optical signals to predetermined receivers on the receiving side in an optical fiber transmission system or an optical signal processing system that uses optical wavelength multiplexed signals.

2. Description of the Related Art

The recent development of a large-capacity optical fiber transmission system points toward the use of a wavelength (frequency) multiplexing system as well as a time-sharing multiplexing system. FIG. 3 shows a signal distributing system employing an optical wavelength multiplexing system for distributing signals to a subscriber loop system. An office, i.e., a central office or a remote terminal, comprises a M-channel optical transmitter 4 comprising DFB lasers which emit laser light having different wavelengths, respectively, and an M×N star coupler 5 (M=N=16) not having wavelength dependency. In each channel, signals of 600 Mbit/s or 2 Gbit/s are multiplexed by the direct modulation of the lasers, the star coupler 5 multiplexes sixteen wavelengths and branches the optical power into sixteen to send out an optical multiplexed signal to the subscriber. The operating wavelengths of the sixteen DFB lasers are in the range of 1527 to 1557 nm and the spaces between the operating wavelengths are 2 nm. The optical wavelength multiplexed signals travel 10 km and reach the subscribers. A 1×4 optical coupler 7 on the subscriber's side receives the optical wavelength multiplexed signals and distributes the same to four ports, an etalon-type variable-wavelength filter 8 connected to the output of each port extracts an optical signal of a desired wavelength from the 16 optical wavelength multiplexed signals, and then an optical receiver 9 converts the extracted optical signal into a corresponding electrical signal and processes the same. According to the selected purpose either only one of the four channels or all the four channels of the optical coupler 7 may be used. The variable wavelength filter 8 has a free spectrum range of 52 nm, and a band width of 0.25 nm. This system is capable of transmitting signals at 2 Gbit/s for each channel at a bit error rate of $10^{-9}$ for sixteen channels. Accordingly, the subscriber is free to select information of a large quantity of 32 Gbit/s.

Techniques relating to this system are described in, for example, Electronics Letters, vol. 24, No. 19, pp. 1215-1217 (1988).

The above-mentioned known system employs passive devices including optical couplers and optical filters to multiplex, distribute and demultiplex optical wavelength multiplexed signals, and the passive devices cause optical insertion losses. In the system shown in FIG. 3, an optical insertion loss caused by each channel is 14 dB in an average, an optical loss caused by the 1×4 coupler 7 is 8.5 dB, an optical loss caused by the variable wavelength filter 8 is 6 dB, and hence the total optical insertion loss is 28.5 dB, which is about seven times the transmission loss of 4 dB caused by the optical fiber. Thus, the insertion losses caused by the passive devices can be the limiting factor in terms of the transmission distance. Accordingly, in some cases, wavelength multiplexing transmission is infeasible if the number of the passive optical devices of the subscriber's side is increased to increase the degree of wavelength multiplexing, the insertion loss attributable to each passive optical device increases or when the transmission distance of the trunk or the LAN exceeds 10 km.

FIG. 4 shows the basic configuration of a trunk transmission system employing an optical wavelength multiplexing. A transmitting side comprises a plurality of optical transmitters 10 which generate optical signals respectively having different wavelengths, and an optical wavelength multiplexer 11 which multiplexes the optical signals provided by the optical transmitters 10 to provide an optical wavelength multiplexed signal and applies the signal to a single optical fiber 12. Each optical transmitter 10 is provided, for example, with a laser diode. A receiving side comprises an optical demultiplexer 13 which separates the component optical signals respectively having different wavelengths, and a plurality of optical receivers 14 respectively for converting the separated optical signals into corresponding electrical signals. Each optical receiver is provided, for example, with a photodiode. Consider the 2 Gbit/s 16-channel system previously described in connection with the aforesaid known signal distributing system and suppose that the optical output of the optical transmitter 4 is 0 dBm and the sensitivity of the optical receiver 9 is −30 dBm. If the optical wavelength multiplexer 11 and the optical demultiplexer 13 are provided each with a 1×16 star coupler causing an insertion loss of 14 dB, and the wavelength selector of the optical demultiplexer 13 is provided with a wavelength filter causing an insertion loss of 6 dB, the total insertion loss of the transmission system is 34 dB, the optical power arriving at the optical receiver 14 is −34 dBm lower than the receiver sensitivity and, consequently, the optical signals cannot be transmitted to the receiving side.

FIG. 5 shows another transmission system proposed to solve such a problem (Denshi Joho Tsushin Gakkai Shuki Zenkoku Taikai 1990, B-780, pp. 4-115). This transmission system includes an optical amplifier. Referring to FIG. 5, a transmitting side comprises an optical transmitter 15 comprising four laser diodes of 10 Gbit/s each for one channel, capable of generating optical signals respectively having different wavelengths, and a 1×4 optical coupler 16. An optical signal produced by 4-wave multiplexing is transmitted through a single optical fiber 17 of 40 km in length to an optical filter 18. The optical filter 18 extracts a component optical signal of a desired wavelength from the received optical wavelength multiplexed signals, an optical amplifier 19 amplifies the extracted optical signal, an optical filter 20 removes noise related to the amplified spontaneous emission in the optical amplifer 19, and then an optical receiver 21 converts the output signal of the optical filter 20 into a corresponding electrical signal. The optical amplifier 19 makes compensates for the losses caused by the optical coupler 16, the optical fiber 17 and the optical filter 18 to amplify the optical signal to a level corresponding to the sensitivity of the optical receiver 21. Thus, the use of an optical amplifier in a system provided with passive devices that cause large insertion losses is effective. However, if the degree of wavelength multiplexing is increased, the optical demultiplexer disposed above the optical receiver will need a plurality of optical amplifiers. No study has been made concerning the arrangement of a plurality of optical amplifiers in the optical demultiplexing system. Thoughtless arrangement of optical amplifiers will increase the number of optical amplifiers excessively inevitably increasing power consumption. Since the power consumption of one current optical amplifier is 0.5 W or above, ten optical amplifiers will consume power of 5 W or above.

SUMMARY OF THE INVENTION

Accordingly, it is an object of the present invention to provide an optical demultiplexing system capable of obviating the drop of the level of optical signals due to insertion losses caused by passive devices below a level corresponding to the level of the sensitivity of the optical receiver, the excessive increase of optical amplifiers in number for making compensation for the attenuation of optical signals, and the increase of power consumption attributable to the increase of optical amplifiers in number.

With the foregoing object in view, the present invention connects optical amplifiers to the inputs of the optical demultiplexers, respectively, of a receiving side in a plurality of stages optical amplifier to amplify the optical signal before the reduction of the S/N ratio due to the drop of the level of the optical signal attributable to insertion losses caused by the optical demultiplexers below an S/N ratio guaranteeing a given bit error rate. The optical amplifiers are arranged in a plurality of stages to amplify the optical signal repeatedly before the optical signal reaches an optical receiver. Similarly, optical amplifiers are connected to the inputs of the optical demultiplexers of a receiving side, each of the optical amplifiers disposed at a position that enables the optical receiver of an optical demultiplexer to compensate for the optical insertion loss so that the level of the optical signal is not lower than the level of the reception sensitivity of the optical receiver guaranteeing the given bit error rate, and the optical amplifiers are connected to the inputs of the optical demultiplexers in a plurality of stages to amplify the optical signal sequentially and repeatedly. As a prerequisite condition, the S/N ratio of the optical signal at the input of the optical demultiplexer of the receiving side must be sufficiently higher than shot noise and higher than an S/N ratio guaranteeing a given bit error rate. Naturally, optical amplifiers must be inserted in the transmitting side and the optical transmission line to meet this prerequisite condition. These means for solving the problems in the conventional system always take a predetermined S/N ratio into consideration and amplify the optical signal by the optical amplifiers before failing in securing the predetermined S/N ratio so that the predetermined S/N ratio can be maintained.

Since the ability of the optical amplifier is utilized for the maximum possible effect, the optical insertion loss caused by the optical demultiplexer is limited to the least extent, and problems due to the increase in number of optical amplifiers and the associated devices, the increase of the cost and power consumption can be solved.

According to the present invention, a first optical amplifier is connected to the input of the optical demultiplexing system to increase the S/N ratio so that an S/N ratio guaranteeing the given bit error rate representing transmission quality can be secured, and the optical insertion losses caused by the optical demultiplexers can be compensated for by the least necessary number of optical amplifiers. Consequently, the optical demultiplexing system has a compact configuration and is capable of operating at a low power consumption. The present invention can be readily practiced by employing either conventional devices or a monolithic integrated circuit.

BRIEF DESCRIPTION OF THE DRAWINGS

The above and other objects, features and advantages of the present invention will become more apparent from the following description taken in connection with the accompanying drawings, in which:

FIG. 4 is a block diagram of a trunk transmission system employing a conventional optical multiplexing system.

FIG. 5 is a block diagram of a conventional optical wavelength multiplexing transmission system provided with an optical amplifier.

DETAILED DESCRIPTION

Figure 1:
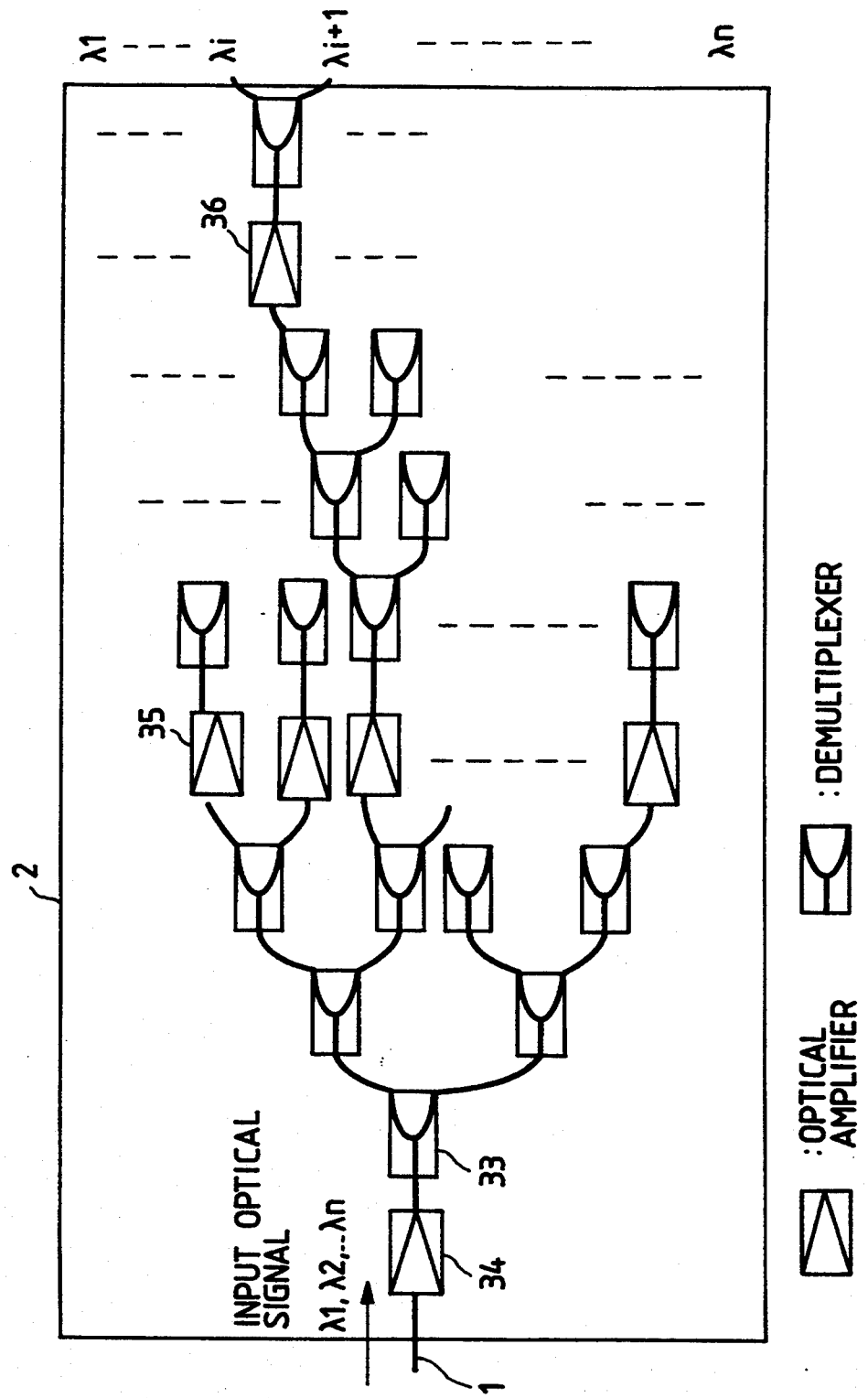
FIG. 1 is block diagram of an optical demultiplexing system in a first embodiment according to the present invention.
Figure 2:
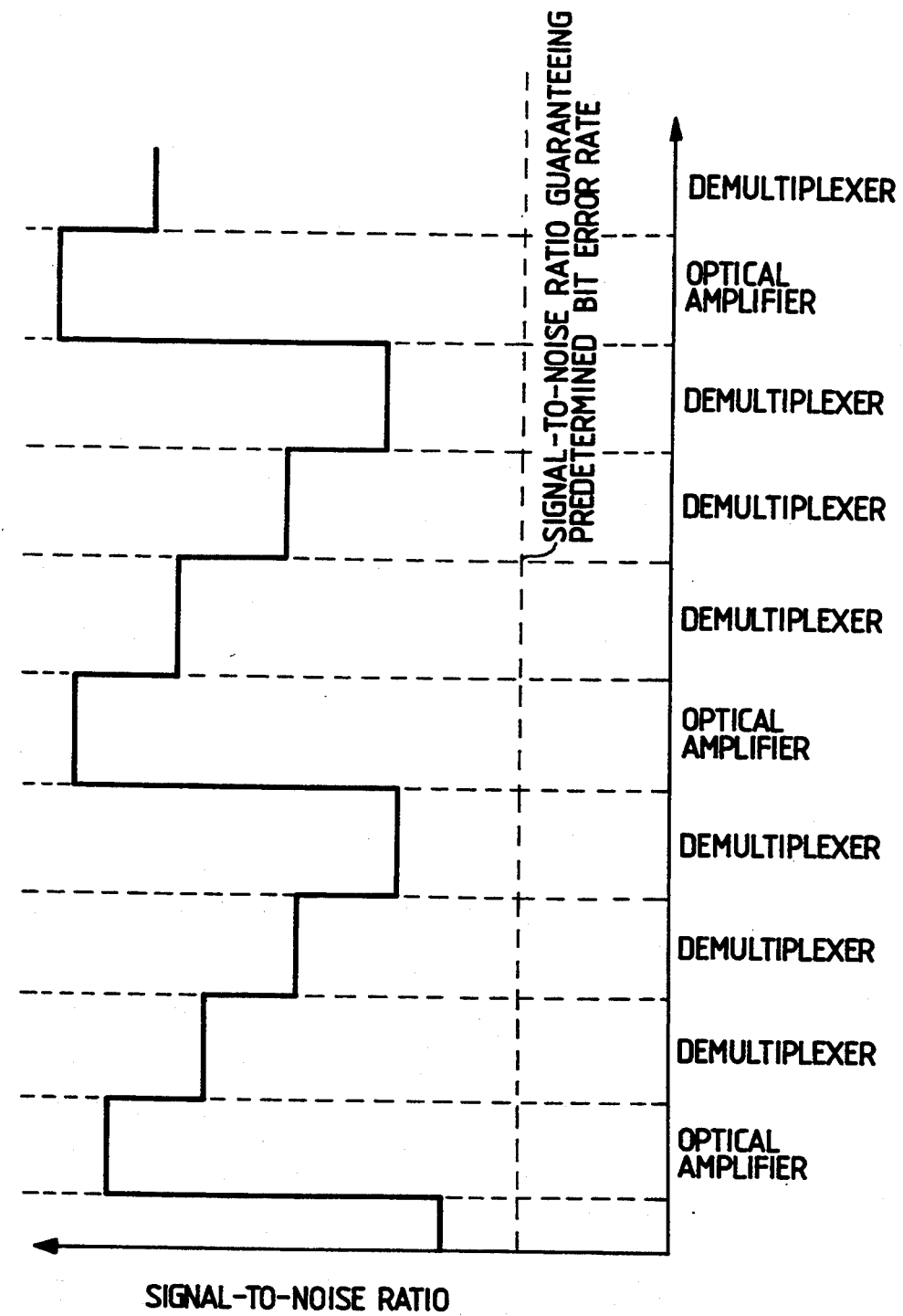
FIG. 2 is a diagram for explaining the operation of the optical demultiplexing system of FIG. 1 for regulating S/N ratio.

Referring to FIG. 1, an optical demultiplexer 2 comprising a plurality of demultiplexers 33 receives an optical multiplexed signal produced by multiplexing a plurality of optical signals respectively having wavelengths $\lambda 1$ to $\lambda n$ transmitted through an optical fiber 1. An optical amplifier 34 having a gain G and a noise factor F is connected to the input of the demultiplexer 33 of the optical demultiplexer 2. The optical amplifier 34 in this embodiment is an erbium-injected optical fiber amplifier. The optical multiplexed signal amplified by the optical amplifier 34 is given to the demultiplexer 33. Each demultiplexer, which causes an insertion loss L, is a combination of a 1×2 optical coupler, and an optical filter employing a multilayer dielectric film having a specific wavelength filtering characteristic capable of extracting an optical signal having a desired wavelength. The optical demultiplexers are connected in a tree-connection to distribute the optical signals respectively having wavelengths $\lambda 1$ to $\lambda n$ to predetermined optical receivers. The S/N ratio (SNR) of an optical signal which has passed m optical demultiplexers is expressed by:

$$SNR = 4G \cdot S_0 / \{e(G-1)F \cdot m \cdot L \cdot B\} \tag{1}$$

where $S_0$ is input optical power of the optical amplifier, e is elementary electric charge, and B is transmission rate. If the SNR of the optical signal drops below a requisite $SNR_{rq}$ that guarantees a predetermined bit error rate after the optical signal has passed (m+1)

optical demultiplexers, an optical amplifier 35 is connected to the outputs of optical demultiplexers on the m-th stage. For example, an $SNR_{rq}$ that guarantees a bit error rate of $10^{-9}$ is 6. Connection of optical amplifiers 36 to the last optical demultiplexers to be connected to optical receivers must take noise that may be generated by the optical receivers into consideration.

$$SNR = 4(G \cdot S_0/m \cdot L)^2 / [\{e(G-1)F(G \cdot S_0 m \cdot L) + in\} \Delta f] \quad (2)$$

where in is noise generated by the optical receiver, $\Delta f$ is the band width of the optical receiver. The optical amplifiers are disposed so that the SNR expressed by expression (2) will not be lower than the $SNR_{rq}$. As is obvious from FIG. 2 this arrangement of the optical amplifiers always secures a predetermined SNR.

Suppose that the S/N ratio of the input optical signal to the optical demultiplexing system 2 has an allowance, and an optical amplifier is connected to the output of the optical demultiplexer on the first stage. Then, the positions of the optical amplifiers on the second and the following stages are taken sequentially one stage down and, consequently, an optical demultiplexing system having a tree construction needs more optical amplifiers than the optical demultiplexing system in this embodiment.

Figure 6:
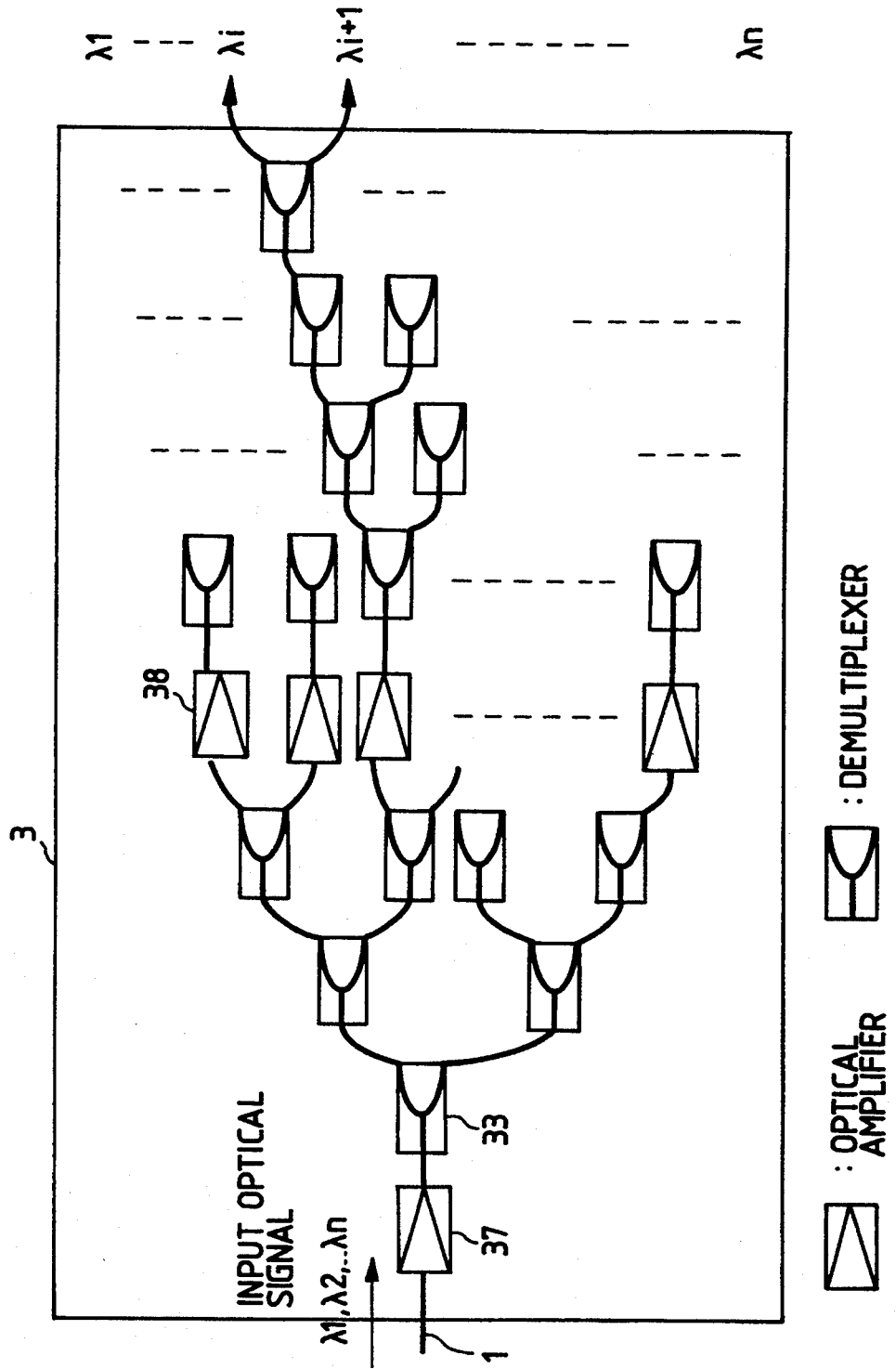
FIG. 6 is a block diagram of an optical demultiplexing system in a second embodiment according to the present invention.
Figure 7:
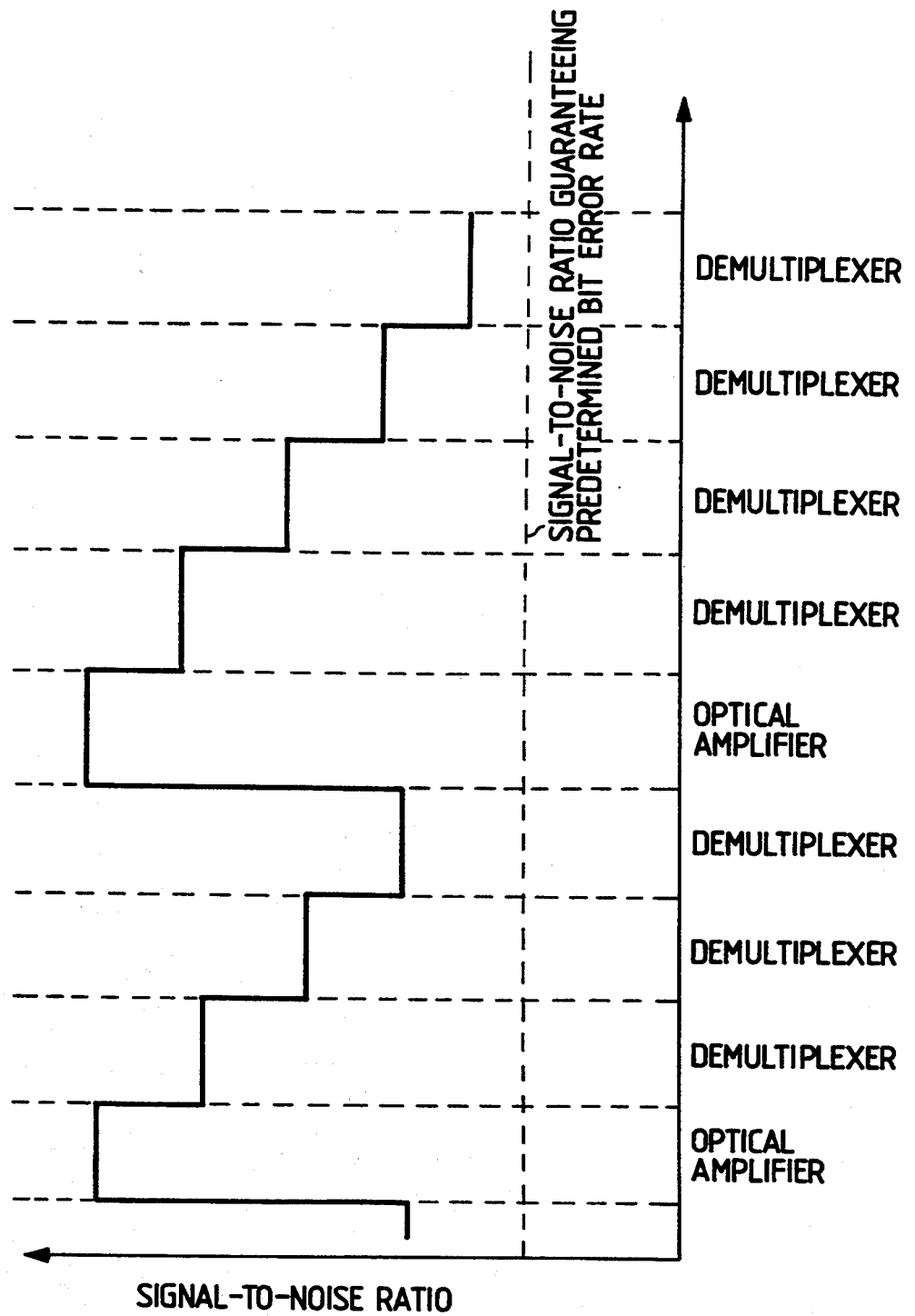
FIG. 7 is a diagram for explaining the operation of the optical demultiplexing system of FIG. 6 for regulating S/N ratio.

Referring to FIG. 6, an optical demultiplexing system 3 in a second embodiment according to the present invention, similar to the optical demultiplexing system 2 shown in FIG. 1, comprises a plurality of optical amplifiers and a plurality of optical demultiplexers. An optical amplifier 37 is connected to the input of the optical demultiplexer 33 on the first stage to amplify an optical multiple signal transmitted through an optical fiber 1. Optical amplifiers 38 are disposed on a stage farthest from an optical receiver capable of securing a predetermined S/N ratio expressed by expression (2). The rest of the optical amplifiers are arranged sequentially with reference to the position of the optical amplifiers 38 so as to meet a condition expressed by expression (1). The optical demultiplexing system in the second embodiment is an optical demultiplexing system for demultiplexing a 128-wave optical multiple signal. As is apparent from FIG. 7, it is proper to connect the optical amplifiers 38 to the inputs of the optical demultiplexers on the fourth stage. In this optical demultiplexing system 3, the optical insertion losses that will be caused by the optical demultiplexers arranged after those on the fourth stage are compensated for by the optical amplifier 37 on the first stage. Accordingly, the optical demultiplexing system 3 needs only seven optical amplifiers.

Although the foregoing embodiments employ fiber amplifiers and as the optical amplifiers, combinations of an optical coupler and a wavelength filter as the optical demultiplexers, naturally, those optical amplifiers and those optical demultiplexers may be any devices of suitable types. For example, optical semiconductor amplifiers may be employed for the same effect, and the optical demultiplexers may be wavelength filters each comprising an optical coupler or a star coupler, a dielectric substrate and an optical fiber, multilayer dielectric films, directional couplers, wavelength filters using acoustoptics effect, gratings, etalon or Fabry-Pelot resonators or ultrasonic branching filters. Materials of these devices may be any of dielectric materials, fibers and semiconductors. The optical amplifiers and the optical demultiplexers may be of a waveguide type formed of semiconductors to construct the optical demultiplexing system in a monolithic integrated circuit.

Figure 3:
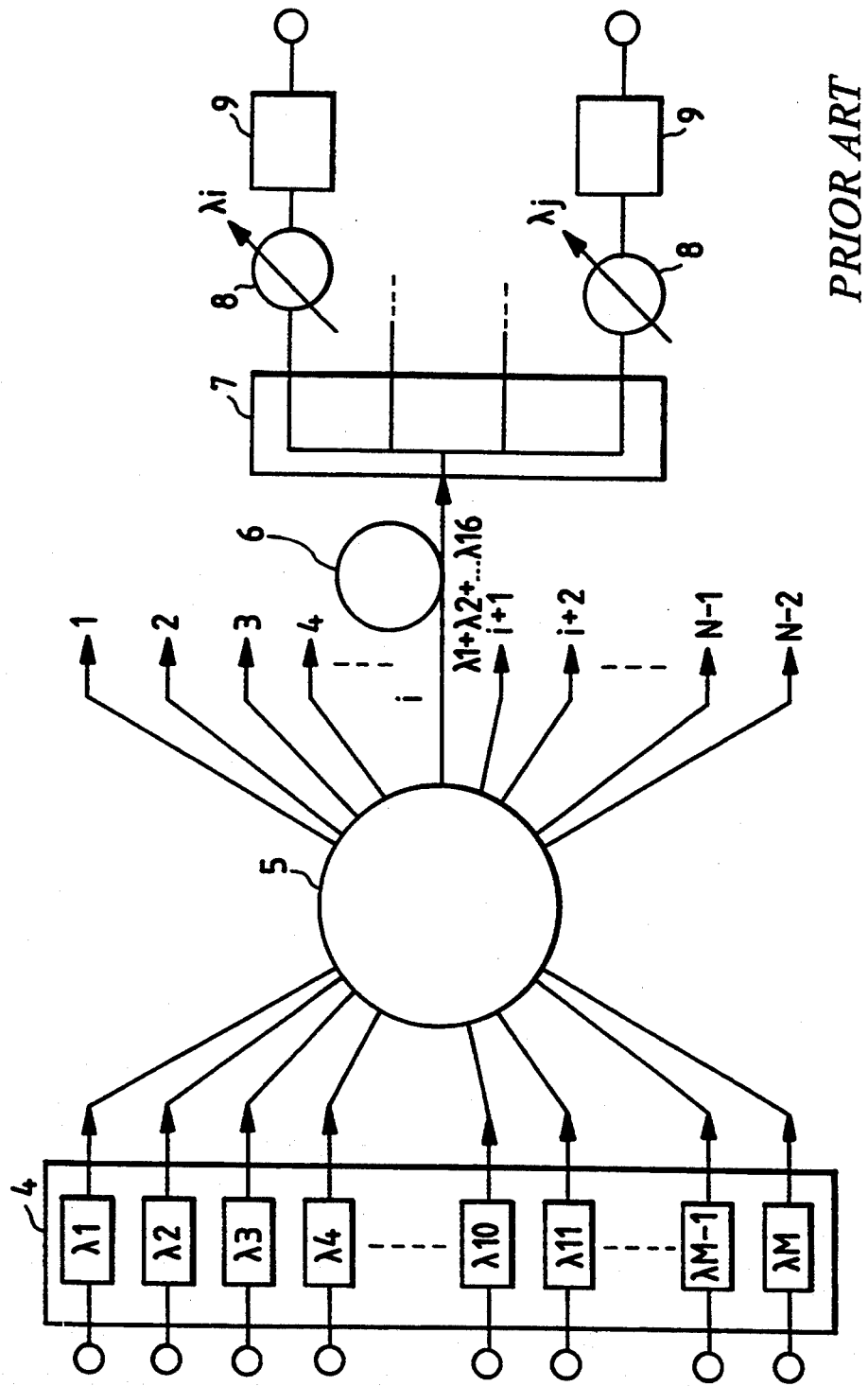
FIG. 3 is a block diagram of a conventional signal distributing system employing a conventional optical wavelength multiplexing system.
Figure 8:
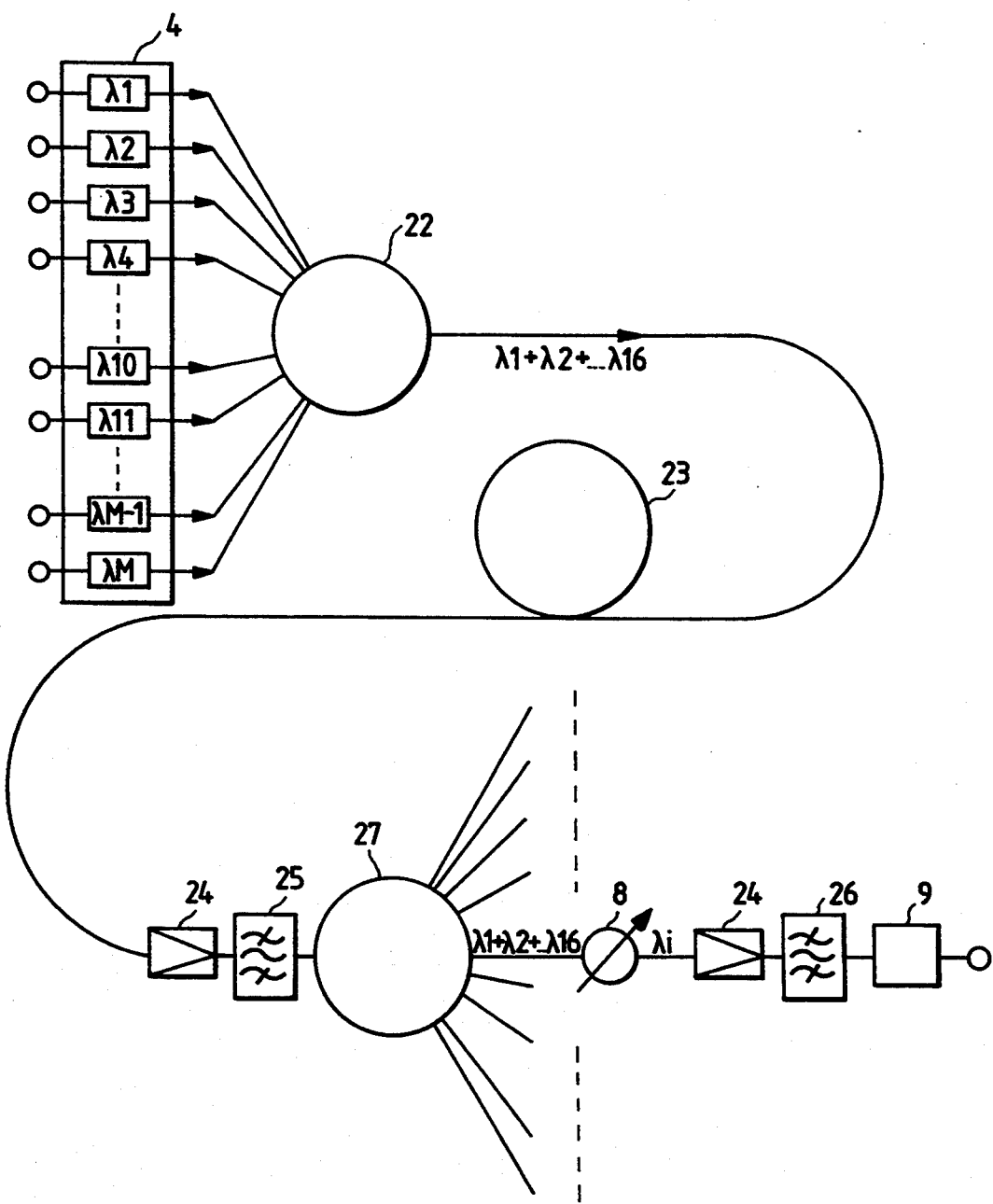
FIG. 8 is a block diagram of a 16-wavelength multiplexing trunk system for optical signal transmission employing an optical demultiplexing system in accordance with the present invention.

FIG. 8 shows a 16-wavelength multiplexing trunk system for 32 Gbit/s-80 km transmission comprising conventional devices and an optical demultiplexing system in accordance with the present invention. The trunk system employs an optical transmitter 4, which is the same as that employed in the conventional optical signal distributing system shown in FIG. 3. An optical multiplexed signal of 2 Gbit/s for each channel sent out by the optical transmitter 4 travels through an optical fiber 23 of 80 km in length and reaches an optical demultiplexing system 27. The optical fiber 23 causes a transmission loss of 20 dB. In the optical demultiplexing system 27, first an optical fiber amplifier 24 having a gain of 20 dB and a noise factor of 4 dB amplifies the optical signal, an optical filter 25 removes noise generated by the optical fiber amplifier 24, and then the optical signal filtered by the optical filter 25 is separated into 16 component optical signals by a 1×6 star coupler 22. Then the component optical signals are filtered by wavelength filters 8 to give an optical signal having a predetermined wavelength to an optical fiber amplifier 24 of each channel. The output optical signal of each optical fiber amplifier 24 is filtered by an optical filter 26 to remove noise generated by the optical fiber amplifier 24, the output optical signal of the optical filter 26 is converted into a corresponding electrical signal by an optical receiver 9. Since the optical amplifiers amplify the optical signals, the power of the input optical signals to the optical receivers 9 is −24 dBm, which is higher than the reception sensitivity of −30 dBm. Thus, the large-capacity 32 Gbit/s transmission system is feasible.

As is apparent from the foregoing description, the optical demultiplexing system in accordance with the present invention is provided with the least necessary number of optical amplifiers disposed so as to compensate for optical insertion losses so that an S/N ratio guaranteeing a predetermined bit error rate can be secured. Accordingly, the optical demultiplexing system is capable of operating at a low loss and at a low power consumption rate, needs a comparatively small number of component devices including the optical amplifiers, can be fabricated at a comparatively low cost, and has a high reliability.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. In an optical demultiplexing system comprising: a plurality of optical demultiplexers connected in a tree-connection separating the optical signals respectively having different wavelengths of an input wavelength-multiplexed optical multiple signal;
   a first optical amplifier connected to the input of the optical demultiplexer disposed at the first stage of the tree connection; and
   a plurality of optical amplifiers connected to the inputs of the optical demultiplexers disposed at a stage in the tree-connection before the S/N ratio of the optical signal is caused to fall by optical losses below a predetermined S/N ratio guaranteeing a predetermined bit error rate.

2. An optical demultiplexing system according to claim 1, wherein the position of the optical amplifier nearest to an optical receiver is determined so that the output power of the same optical amplifier is not lower than the reception sensitivity of the corresponding optical receiver.

3. A wavelength multiplex transmission system comprising the optical demultiplexing system stated in claim 1.

4. An optical demultiplexing system according to claim 1, wherein the optical amplifiers are of a fiber type.

5. An optical demultiplexing system according to claim 1, wherein the optical amplifiers are semiconductor amplifiers.

6. An optical demultiplexing system according to claim 1, wherein the optical demultiplexers are wavelength filters employing a multilayer dielectric film.

7. An optical demultiplexing system according to claim 1, wherein the optical demultiplexers are wavelength filters employing an etalon or Fabry-Pelot resonator.

8. An optical demultiplexing system according to claim 1, wherein the optical demultiplexers are wavelength filters employing a directional coupler.

9. An optical demultiplexing system according to claim 1, wherein the optical demultiplexers are wavelength filters employing a grating.

10. An optical demultiplexing system according to claim 1, wherein the optical demultiplexers are wavelength filters utilizing acoustooptical effect.

11. An optical demultiplexing system according to claim 1, wherein the optical demultiplexers are wavelength filters employing a dielectric substrate.

12. An optical demultiplexing system according to claim 1, wherein the optical demultiplexers are wavelength filters employing an optical fiber.

13. An optical demultiplexing system according to claim 1, wherein the optical demultiplexers are wavelength filters fabricated by processing semiconductors.

14. An optical demultiplexing system according to claim 1, wherein the optical demultiplexers are optical couplers.

15. An optical demultiplexing system according to claim 1, wherein the optical demultiplexers are star couplers.

16. An optical demultiplexing system according to claim 1, wherein the optical amplifiers and the optical demultiplexers are included in a monolithic integrated circuit.

17. A wavelength multiplex trunk system comprising the optical demultiplexing system stated in claim 1.

* * * * *

UNITED STATES PATENT AND TRADEMARK OFFICE
CERTIFICATE OF CORRECTION

PATENT NO. : 5,422,968
DATED : June 6, 1995
INVENTOR(S) : Shoichi Hanatani et al It is certified that error appears in the above-indentified patent and that said Letters Patent is hereby corrected as shown below:

| Column | Line | |
|---|---|---|
| 2 | 58 | Delete "makes". |
| 3 | 3 | After "excessively" insert --and--. |
| 3 | 15 | After "increase" insert --in the number--. |
| 3 | 16 | Delete "in number"; after "for" (first occurrence) change "making compensation" to --compensating--. |
| 3 | 17 | Change "increase of" to --increased--. |
| 3 | 18 | After "increase" insert --in the number--; delete "in". |
| 3 | 19 | Delete "number". |
| 3 | 51 | Change "in securing" to --to secure--. |
| 3 | 52 | After "ratio" insert --,--. |

UNITED STATES PATENT AND TRADEMARK OFFICE
CERTIFICATE OF CORRECTION

PATENT NO. : 5,422,968
DATED : June 6, 1995
INVENTOR(S) : Shoichi Hanatani et al It is certified that error appears in the above-indentified patent and that said Letters Patent is hereby corrected as shown below:

| Column | Line | |
|---|---|---|
| 3 | 67 | Change "least" to --minimum--. |
| 4 | 10 | Change "connection" to --conjunction--. |
| 4 | 12 | After "is" insert --a--. |
| 5 | 9 | Change "...$S_o m \cdot L)$..." to --...$S_o/m \cdot L)$...--. |
| 5 | 54 | After "amplifiers" (first occurrence) delete "and"; after "amplifiers," (second occurrence) insert --and--. |
| 6 | 20 | Change "1 x 6" to --1 x 16--. |
| 6 | 37 | Change "least" to --minimum--. |
| 6 | 55 | Delete "In"; change "an" to --An--. |

Signed and Sealed this

Twenty-fourth Day of October, 1995

Attest:

BRUCE LEHMAN

*Attesting Officer*   *Commissioner of Patents and Trademarks*